Patented June 2, 1936

2,042,705

UNITED STATES PATENT OFFICE 2,042,705

MANUFACTURE OF CELLULOSE FROM LIGNO-CELLULOSIC PRODUCTS

Henry Dreyfus, London, England

No Drawing. Original application February 28, 1934, Serial No. 713,308. Divided and this application January 4, 1935, Serial No. 330. In Great Britain March 7, 1933

12 Claims. (Cl. 92—9)

This invention is a divisional of U. S. application S. No. 713,308, filed Feb. 28, 1934 and relates to the manufacture of cellulose from ligno-cellulosic materials, for example wood, straw and grass.

I have found that very satisfactory separation of the encrusting materials from the cellulose in ligno-cellulosic materials may be produced by treating or extracting them with organic solvents of different polarities in admixture with each other, for example a mixture of a polar liquid and preferably a strongly polar liquid with a non-polar liquid, or a mixture of two polar liquids having different polarities, or in other words containing groups of different polarities or dipole moments.

Thus, mixtures of alcohols, ketones, aldehydes, esters or acids may be employed in admixture with non-polar organic solvents, for example benzene, toluene, xylene or other hydrocarbons, carbon tetrachloride, hexa-chlorethane or similar non-polar chlorinated hydrocarbons. Again, mixtures of strongly polar liquids such as the alcohols, ketones, aldehydes, esters or acids may be employed together with less strongly polar liquids such as the ethers, for example diethyl ether or di-isopropyl ether. Again, three or more organic liquids having different polarities may be employed, for instance mixtures of methyl ethyl ketone or other ketones with ethers such as di-isopropyl ether and hydrocarbons or non-polar chlorinated hydrocarbons, or mixtures of ketones, for example methyl ethyl ketone, with cyclic ethers, for instance dioxane and hydrocarbons or other non-polar solvents. Thus, I may employ a mixture of 90 parts of ethyl alcohol and 10 parts of benzene, a mixture of 40 to 60 parts of dioxane with 60 to 40 parts of acetone, a mixture of 40 to 70 parts of methylene or ethylene chloride or other polar chlorinated hydrocarbons with 60 to 30 parts of methyl, ethyl or isopropyl alcohol, or a mixture of 40 to 60 parts of acetone or alcohol with 60 to 40 parts of diethyl ether or di-isopropyl ether. Generally in such mixtures it is preferable to have present at least one component which is soluble in water.

Examples of other solvents that may be employed in such mixtures are cyclic ketones such as cyclo-hexanone, methyl cyclo-hexanone and other ketonic substances such as pyruvic acid and diacetone alcohol; aromatic aldehydes; lower fatty acids such as acetic acid and esters of lower fatty acids such as methyl and ethyl formate and acetate; methylene ethylene ether and its homologues and homologues of dioxane such as dimethyl dioxane; substances containing both carbonyl groups, especially ketonic groups, and ether groups such as tetrahydropyrone (1,4-oxanone) and its homologues and substitution products. Preferably formic acid is not employed since under the preferred conditions for the extraction it is liable to give rise to an undue amount of degradation of the cellulose.

The ligno-cellulosic material is preferably subjected to the action of the solvents or solvent mixtures while in a finely divided form. For example wood may advantageously be employed in the form of chips or even of a mechanical pulp. Preferably the treatment of the material is effected at a temperature considerably higher than atmospheric. Thus, for example, temperatures between about 50° and 200° C., for instance between 80° and 140° or 170° C., may be employed; temperatures higher or lower than these may, however, be employed if desired. Conveniently the process may be carried out under constant volume conditions, for example in closed digesters or other vessels, so that the pressure automatically adjusts itself to the temperature employed.

It is desirable to ensure a thorough impregnation of the material by the solvent or solvent mixture. Thus, although the material may be simply agitated with the solvent or solvent mixture under the conditions of temperature and pressure described above, it is preferable to aid the impregnation, for example by first evacuating to any desired degree the digester or other vessel containing the material and then introducing the solvent or solvent mixture into the evacuated vessel at atmospheric or higher pressure. The use of pressures higher than atmospheric for the treatment itself also assists in procuring a thorough impregnation. Other methods may be used to attain the same end, for example the sudden release of pressure within the materials, whereby the active surface of the materials is increased to a very large extent. As described in my U. S. application S. No. 565,203 filed 25th September, 1931, such a process may be carried out by causing the sudden vaporization of a liquid within the material. Any other method of securing an efficient contact between the material and the solvent or solvent mixture may be employed.

The treatment of the ligno-cellulosic material with the solvent or solvent mixture may be effected in a single stage or two or multi-stage process and in a continuous or discontinuous manner. For example, the extraction may be performed in digesters or vessels such as are commonly employed in pulping processes, for example in the sulphite process. In another method of carrying out the invention the material may be subjected to a continuous extraction with the solvent or solvent mixture. For example the material may be caused to travel through a reaction vessel in a direction counter to that of a stream of solvent or solvent mixture. In any case the solvent or solvent mixture may, after the treatment, be freed from lignin and other substances and returned to the process. For example the solvent or solvent mixture may be distilled off, leaving the lignin and other substances in the solid form.

Other compounds capable of aiding the removal of lignin and other substances, for example by exercising a softening or slight destructive effect on the cellular structure of the materials, may also be present. Thus, for example, mineral acids or alkalies may be used in conjunction with the extracting liquor. Moreover, organic acids may be thus employed and may then act also as extracting agents according to the invention. Mineral acids if present should be present only in very small quantities or very low concentrations, particularly if temperatures above 100° C. or thereabouts are employed for the extraction step. Similarly, alkalies are liable to exert a degrading action upon the cellulose at high temperatures, and it is preferable, in employing either mineral acids or alkalies to soften the materials, to carry out the softening process as a pretreatment before the extracting step proper, and to remove or substantially remove the acid or alkali used for the softening before carrying out the extraction step. Such removal may, for example, be effected by washing with water or with a solvent, for example the solvent or solvent mixture subsequently to be used for the extraction.

If desired the ligno-cellulosic material may be subjected to other treatments prior to extraction by the process of the present invention, for example to treatments to remove resins. Thus, a simple extraction of the resins with benzene or benzene-alcohol mixtures may be applied. However, the resins are usually quite readily extracted in the process of the present invention, and such a procedure is generally unnecessary unless the lignin is required in a more or less purified form.

The cellulose produced by the process of the present invention may be employed, if desired after any other treatment, for any of the purposes for which cellulose is used, for example for the manufacture of cellulose ethers, cellulose nitrate or cellulose xanthate, or for the manufacture of paper, especially the better classes of paper, or for the manufacture of other cellulose derivatives. In the case of the manufacture of cellulose acetate or other organic derivatives of cellulose, it is advantageous to apply a pretreatment before carrying out the esterification process. Thus, the extracted cellulose may be subjected to treatment with lower fatty acids if a lower fatty acid has not already been employed in the extraction process. Again, a two-stage pretreatment may be applied such as that described in my U. S. Patent No. 1,711,110 involving a preliminary treatment with hot dilute alkali or with cold strong alkali followed by a treatment with an organic acid and particularly a lower fatty acid.

The following examples illustrate the invention:—

Example 1

Wood chips are sprayed with their own weight of a mixture of 30 parts of concentrated hydrochloric acid and 70 parts of glacial acetic acid and are allowed to remain at atmospheric temperature for 6 hours. After this period the cellulose is washed thoroughly first with water and then with a mixture of di-isopropyl ether and ethyl alcohol in equal parts by volume. The wood chips are then mixed with 8 to 10 times their weight of a mixture of equal parts by volume of isopropyl ether and ethyl alcohol in an autoclave. The contents of the autoclave are then heated to a temperature of 180 to 200° C. for 2 to 3 hours, after which the solvent may be withdrawn, preferably without reducing the pressure, and further solvent introduced. The extraction may thus be carried out in stages and is generally complete after digestion with the solvent mixture for about 9 to 12 hours. In the second or later stages of the extraction the temperature may be increased somewhat, for example to about 220 to 230° C. The cellulosic material remaining after the extraction may be washed, for example with water or with alcohol.

Example 2

Wood chips are treated as described in Example 1, with or without the acid treatment, with the exception that the extracting liquid consists of a mixture of equal parts of methylene chloride and methyl alcohol and the temperature is maintained throughout the extraction at 170 to 180° C.

Example 3

Wood chips are treated as in Example 1, with or without the acid treatment, with the exception that as extracting agent there is used a mixture of 50 parts by volume of dioxane with 50 parts of acetone.

Example 4

Wood chips are treated as in Example 1, with or without the acid treatment, with the exception that as extracting agent there is used a mixture of 50 parts by volume of alcohol, 30 parts of acetone and 20 parts of benzene.

What I claim and desire to secure by Letters Patent is:—

1. Process for the production of cellulose from ligno-cellulosic materials, comprising extracting the materials at an elevated temperature with a substantially neutral solvent mixture of non-phenolic purely organic liquids of substantially different dipole moment due to the presence in the molecule of groups of different type.

2. Process for the production of cellulose from ligno-cellulosic materials, comprising subjecting the materials to extraction with a substantially neutral solvent mixture comprising a non-polar and a non-phenolic polar purely organic liquid.

3. Process for the production of cellulose from ligno-cellulosic materials, comprising subjecting the materials to extraction with a substantially neutral solvent mixture comprising a simple oxygenated aliphatic compound and a non-polar purely organic liquid.

4. Process for the production of cellulose from ligno-cellulosic materials, comprising subjecting the materials to extraction with a substantially neutral solvent mixture comprising an aliphatic alcohol and a hydrocarbon.

5. Process for the production of cellulose from ligno-cellulosic materials, comprising subjecting the materials to extraction with a solvent mixture comprising ethyl alcohol and benzene.

6. Process for the production of cellulose from ligno-cellulosic materials, comprising subjecting the materials to extraction with a solvent mixture comprising ethyl alcohol, acetone and benzene.

7. Process for the production of cellulose from ligno-cellulosic materials, comprising subjecting the materials to extraction with a substantially neutral solvent mixture comprising non-phenolic purely organic liquids containing respectively groups of different dipole moment.

8. Process for the production of cellulose from ligno-cellulosic materials, comprising subjecting the materials to extraction with a solvent mixture comprising an aliphatic alcohol and a polar chlorinated hydrocarbon.

9. Process for the production of cellulose from ligno-cellulosic materials, comprising subjecting the materials to extraction with a solvent mixture comprising methyl alcohol and methylene chloride.

10. Process for the production of cellulose from ligno-cellulosic materials, comprising subjecting the materials to extraction with a solvent mixture comprising a cyclic ether and a non-phenolic purely organic liquid containing a different polar group.

11. Process for the production of cellulose from ligno-cellulosic materials, comprising subjecting the materials to extraction with a solvent mixture comprising dioxane and a ketone.

12. Process for the production of cellulose from ligno-cellulosic materials, comprising subjecting the materials to extraction with a solvent mixture comprising dioxane and acetone.

HENRY DREYFUS.